United States Patent [19]
Karagiannis et al.

[11] Patent Number: 5,867,023
[45] Date of Patent: Feb. 2, 1999

[54] CONVERTER CIRCUIT FOR ROTARY TRANSFORMER SENSING DEVICES

[75] Inventors: Antonios L. Karagiannis; Kazimierz A. Bukowski; James J. Wrobel, all of Rockford, Ill.; James W. Susong, Janesville, Wis.

[73] Assignee: Sunstrand Corporation, Del.

[21] Appl. No.: 794,376

[22] Filed: Feb. 4, 1997

[51] Int. Cl.[6] .................................. G01B 7/30; G05B 1/06
[52] U.S. Cl. .................... 324/207.25; 318/605; 318/654; 324/207.17
[58] Field of Search ...................... 324/163, 165, 324/207.17–207.19, 207.25; 318/605, 654–661; 340/870.32–870.36

[56] References Cited

U.S. PATENT DOCUMENTS

| | | | |
|---|---|---|---|
| 4,134,065 | 1/1979 | Bauer et al. | 324/207.18 |
| 4,378,519 | 3/1983 | Duvall | 318/660 X |
| 4,514,689 | 4/1985 | Gerard | 324/207.18 |
| 4,605,889 | 8/1986 | Luneau | 324/163 X |
| 4,982,156 | 1/1991 | Lewis et al. | 324/207.18 |
| 5,229,697 | 7/1993 | Taylor et al. | 318/605 X |

*Primary Examiner*—Gerard R. Strecker
*Attorney, Agent, or Firm*—Marshall, O'Toole, Gertein, Murray & Borun

[57] ABSTRACT

A converter circuit for converting an alternating signal representing continuous rotary position into a further signal representing discrete rotary position samples the polarity of an envelope of the alternating signal and develops a state change in the further signal when the envelope changes polarity.

20 Claims, 5 Drawing Sheets

CONVERTER CIRCUIT FOR ROTARY TRANSFORMER SENSING DEVICES

TECHNICAL FIELD

The present invention relates generally to converter circuits, and more particularly to circuits for converting the output of a rotary transformer sensing device, such as a synchro or a resolver, into signals representing discrete position.

BACKGROUND ART

In many rotary machine applications, it is necessary to detect rotor position. For example, where a brushless DC motor is to be operated, motor shaft position must be detected so that a power semiconductor switching network in the form of an inverter can be properly controlled to commutate the currents in the motor windings. In most simple motor controls, position information is only required every 60 electrical degrees. Many commercial and industrial brushless DC drives employ signals from Hall-effect devices, which detect the magnetic field of the motor permanent magnets. There are applications, however, where Hall-effect devices cannot meet performance requirements, for example, in the aerospace industry where severe environments are encountered. In these applications, synchros are used to sense motor shaft position. These devices are basically rotary transformers with three-phase sine wave voltage outputs having a trigonometric relationship to motor position and which provide infinite resolution of shaft angle.

It would be desirable to use the rugged synchro position sensor with a low cost six step motor drive. In this case, a logic conversion circuit must be provided to adapt the output of the synchro to the motor drive. However, the only devices currently available to perform this function are cost prohibitive, since they cost as much or more than synchro-to-digital converters, which are typically used in applications requiring a high degree of controllability beyond that required in the aerospace industry. Present conversion devices also exhibit significant power dissipation, primarily from the circuits used to excite the primary winding of this synchro. Also, present devices develop false logic transitions and error, particularly at low and high motor speed extremes. These problems can cause errant communication and/or higher switching losses in the inverter.

The need exists for a low cost synchro-to-logic converter which does not require pure sine wave excitation, and which exhibits positive logic transitions and accurate position sensing over a wide range of motor speeds.

SUMMARY OF THE INVENTION

A converter circuit for a rotary transformer type position sensing apparatus achieves a substantial reduction in power dissipation, improves commutation accuracy and reduces switching losses in an inverter.

More particularly, a converter circuit for converting an alternating signal representing continuous rotary position and comprising a series of peaks having amplitudes which vary according to an envelope having an envelope polarity into a further signal representing discrete rotary position includes means operable when the alternating signal is near a peak for sampling the envelope polarity and means coupled to the sampling means for developing a state change in the further signal when the envelope changes polarity.

Preferably, the alternating signal is developed by a synchro having a primary winding which receives an excitation waveform having a waveshape other than a pure sinusoid and a secondary winding. Also preferably, the excitation signal is derived from a clock signal developed by a clock.

Further in accordance with the preferred embodiment, the sampling means comprises a comparator which converts the alternating signal into a square wave. Still further the sampling means may further comprise a logic gate which compares the square wave with a clock signal. In accordance with a specific embodiment, the logic gate comprises an exclusive OR gate.

Still further in accordance with the preferred embodiment, a delay circuit is coupled to the logic gate and the developing means comprises a latch coupled to the delay circuit wherein the latch receives the clock signal at a control input thereof.

In accordance with an alternative aspect of the present invention, a circuit for converting a first plurality of alternating signals developed by a synchro coupled to a rotor into a second plurality of logic signals representing position of the rotor wherein the synchro includes an excitation winding that receives an excitation waveform which is obtained from and phase shifted with respect to a clock signal includes means for converting each alternating signal into a square wave. Means are provided for gating each square wave with the clock signal to obtain a number of sign signals as well as means triggered by the clock signal for repetitively latching each sign signal to derive the second plurality of logic signals.

In accordance with yet another alternative aspect of the present invention, a circuit is provided for converting three alternating signals each representing continuous rotary position and comprising a series of peaks having amplitudes which vary according to an envelope having an envelope polarity into three logic signals representing discrete rotary position. Three comparators are provided each converting one of the alternating signals into a square wave together with three logic gates. Each logic gate is operable when a corresponding alternating signal is near a peak for gating an associated square wave with the clock signal to obtain three sign signals each representing envelope polarity. Three latches are coupled to the three logic gates and are triggered by the clock signal for repetitively latching each sign signal to derive the logic signals.

The present invention permits the output of a synchro to be used with an inexpensive and simple motor drive circuit to obtain a motor control which can be used in harsh environments and which is rugged, reliable and inexpensive.

DESCRIPTION OF THE PREFERRED EMBODIMENTS

Figure 1:
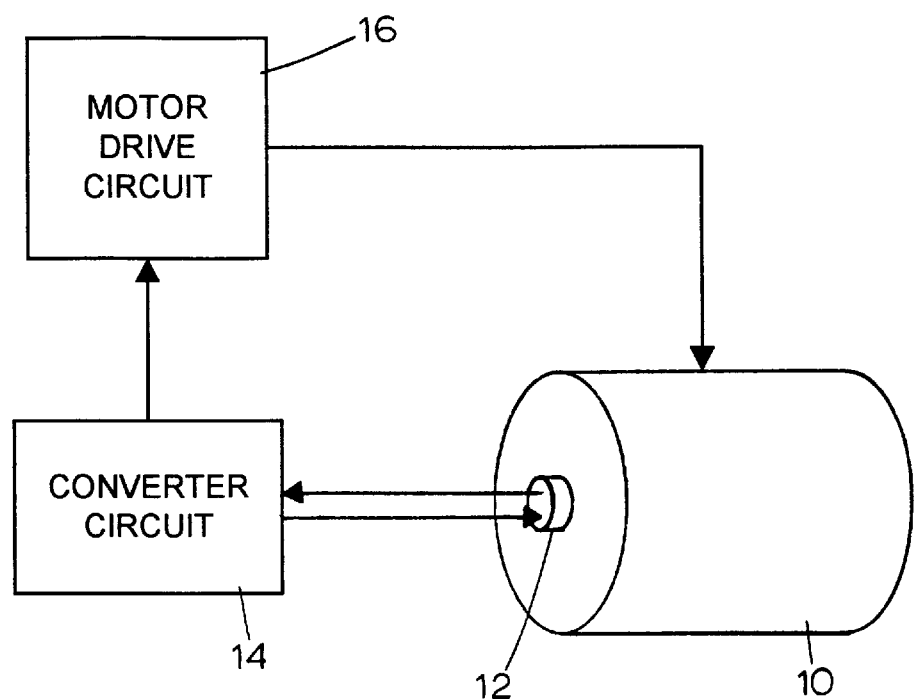
FIG. 1 comprises a block diagram of a motor and motor control circuit incorporating the converter circuit of the present invention.

Referring now to FIG. 1, a rotary dynamoelectric machine, such as an electric motor 10, includes a rotor which is coupled to a rotary-transformer type position sensor in the form of a synchro 12. The synchro 12 receives excitation from a converter circuit 14 according to the present invention and develops one or more alternating waveforms representing continuous rotor position of the motor 10. The converter circuit 14 converts the alternating waveforms into logic signals representing discrete rotor position and provides such signals to a motor drive circuit 16. Preferably, although not necessarily, the motor drive circuit is of the six-step type. The motor drive circuit 16 commutates currents flowing in the windings of the motor 10 based upon the discrete motor position as indicated by the logic signals developed by the converter circuit 14.

Figure 2:
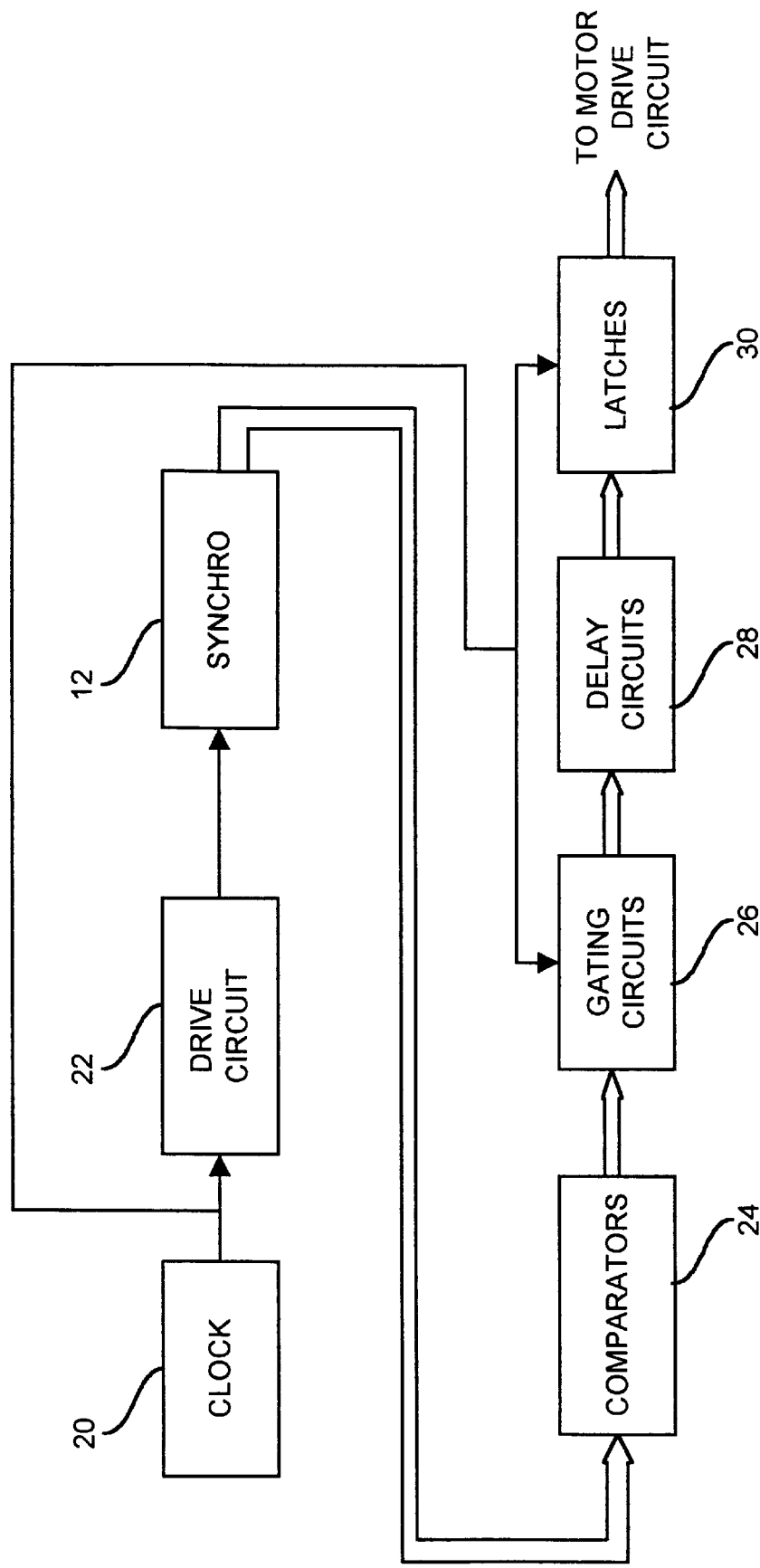
FIG. 2 is a block diagram of the converter circuit of FIG. 1.

FIG. 2 illustrates the converter circuit 14 in greater detail. The circuit includes a clock 20 which develops a clock signal for a number of circuits including a drive circuit 22. The drive circuit 22 develops an excitation waveform of appropriate magnitude and waveshape for the synchro 12. In the preferred embodiment, the synchro 12 can be provided with an excitation waveform which is sinusoidal or non-sinusoidal. Because non-sinusoidal excitation waveforms are easier to produce with inexpensive and simple circuitry, such waveforms are preferred in the present invention. In response to application of the excitation waveform to a primary winding of the synchro 12 a set of three alternating waveforms is provided to a plurality of comparators 24 which convert each alternating waveform into a series of pulses. The outputs of the comparators 24 are gated by gating circuits 26 which are responsive to the clock signals developed by the clock 20 and which develop a set of sign signals. Delay circuits 28 delay the outputs of the gating circuits 26 and a series of latches 30 having control inputs responsive to the clock signal developed by the clock 20 latch the outputs of the delay circuits to produce the logic signals for the motor drive circuit 16.

Figure 3:
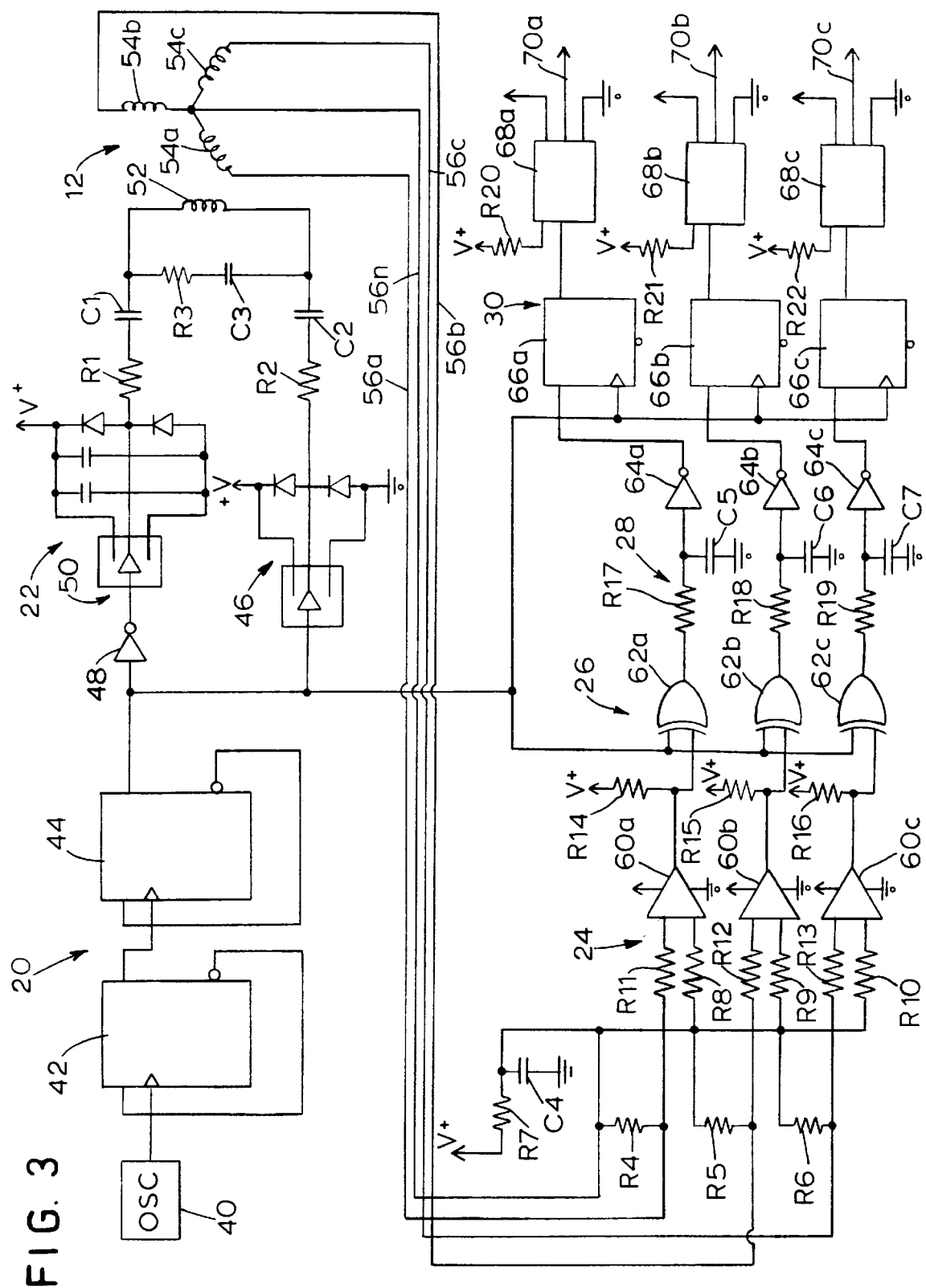
FIG. 3 is a schematic diagram of the converter circuit illustrated in block diagram form in FIG. 2.

FIG. 3 illustrates the converter circuit 14 in greater detail, it being understood that the circuits shown in FIG. 3 are merely exemplary in the sense that other circuits might alternatively be used and still be considered within the scope of the present invention.

The clock 20 includes an oscillator 40 which develops an oscillator output signal that is provided to first and second latch circuits 42, 44. Preferably, the latches 42, 44 comprise cascaded D-type flip flops which divide the frequency of the oscillator output signal by 4. The output of the latch 44 comprises the clock signal, which may have a frequency of, for example, 25 kilohertz.

The clock signal is applied to a first driver 46 and is further supplied through a logic inverter 48 to a second driver 50. The drivers 46, 50, which are preferably of the CMOS type, develop drive signals of appropriate magnitude which are phase shifted by RC networks comprising resistors R1–R3 and capacitors C1–C3. Preferably, for the reasons noted hereinafter, the excitation waveform is phase shifted by 90° and is supplied to a primary winding 52 of the synchro 12.

In addition to the phase shifting function, the RC networks formed by the resistors R1–R3 and the capacitors C1–C3 provide short circuit protection.

The synchro 12 includes first through third secondary windings 54a–54c which are coupled together in a wye configuration. Alternating secondary waveforms developed across the windings 54a–54c are provided over phase conductors 56a–56c and a neutral conductor 56n. The neutral conductor 56n is coupled to the phase conductors 56a, 56b and 56c by resistors R4, R5 and R6, respectively, and is further coupled by a resistor R7 to a source of voltage V+. In addition, the conductor 56n is coupled by a capacitor C4 to ground potential and is further coupled to inverting inputs of first through third comparators 60a–60c through resistors R8, R9 and R10, respectively. A noninverting input of the comparator 60a is coupled to the conductor 56a by a resistor R11 whereas noninverting inputs of the comparator 60b and 60c are coupled to the conductors 56b and 56c by resistors R12 and R13, respectively.

The outputs of the comparators 60a–60c are provided to first inputs of first through third exclusive OR gates 62a–62c each having a second input that receives the clock signal supplied at the output of the latch 44. The first inputs of the exclusive OR gates 62a–62c are further coupled to the voltage V+ by resistors R14–R16, respectively.

The exclusive OR gates 62a–62c are coupled by RC networks forming the delay circuits 28 to logic inverters 64a–64c. The RC networks, comprising resistors R17–R19 and capacitors C5–C7, delay the outputs of the exclusive OR gates 62a–62c a small amount, for example, one microsecond, for reasons explained hereinafter.

The latches 30 comprise D-flip flops 66a–66c having control inputs which receive the clock signal developed at the output of the latch 44. Data inputs of the latches 66a–66c are coupled to the outputs of the inverters 64a–64c. The outputs of the D-flip flops 66a–66c are coupled to buffers 68a–68c. The buffers develop the logic signals far the motor drive circuit 16 on lines 70a–70c. The buffers 68a–68c are further coupled to the voltage V⁺ by resistors R20–R22, respectively.

Figure 4:
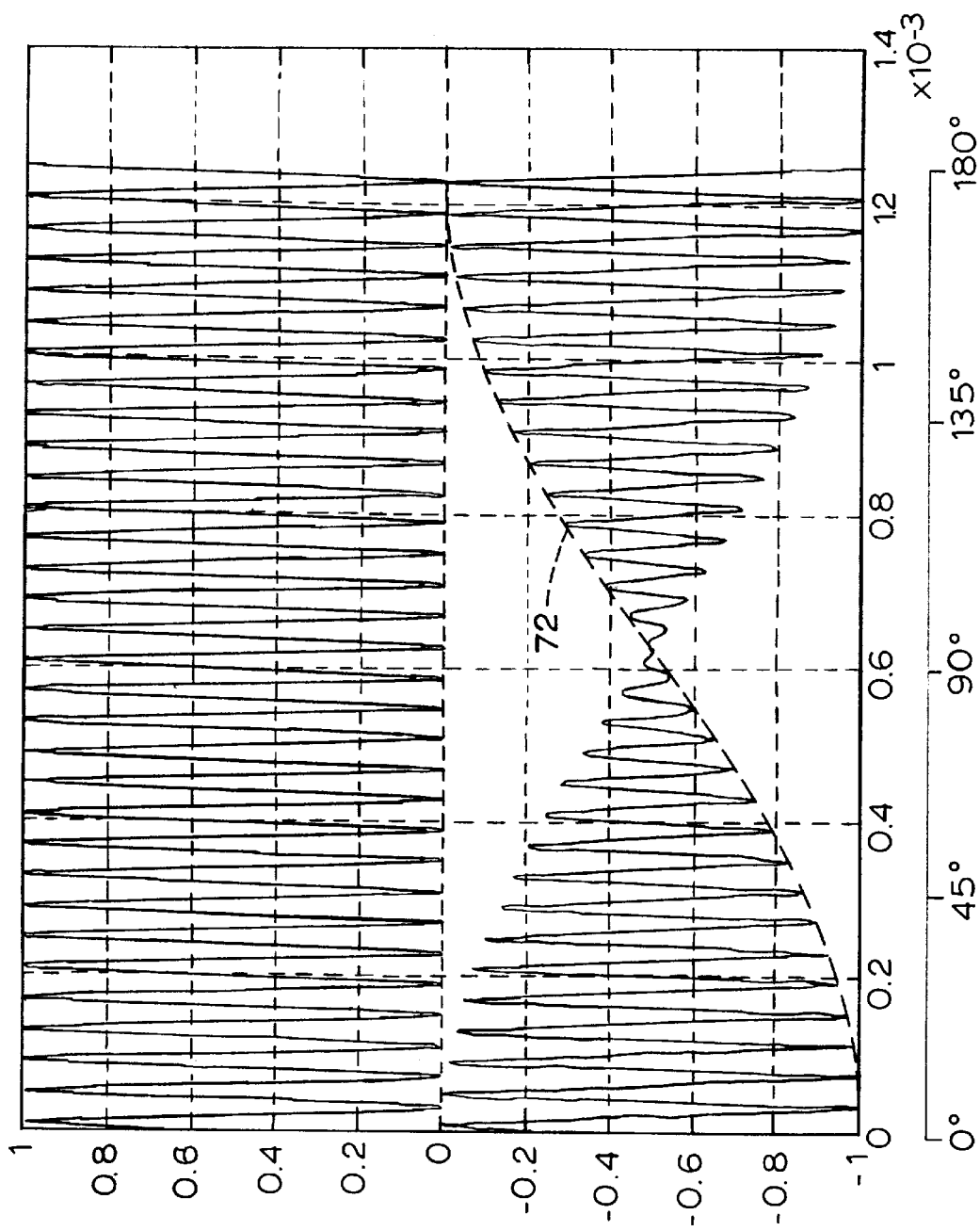
FIGS. 4 and 5 are waveform diagrams illustrating the operation of the circuit of FIGS. 2 and 3.

FIG. 4 illustrates an exemplary excitation waveform for the primary winding 52 of the synchro 12 as well as one of the alternating waveforms developed across the secondary windings 54a–54c. While the excitation waveform (and thus the alternating secondary waveform) is shown in FIG. 4 as a pure sinusoidal waveform, this need not be the case as noted above, and in fact a waveform having a different waveshape may be advantageously utilized instead. In fact, in the embodiment of FIG. 3 the synchro waveform has a nearly triangular shape resulting from integration of the square clock pulses.

Figure 5:
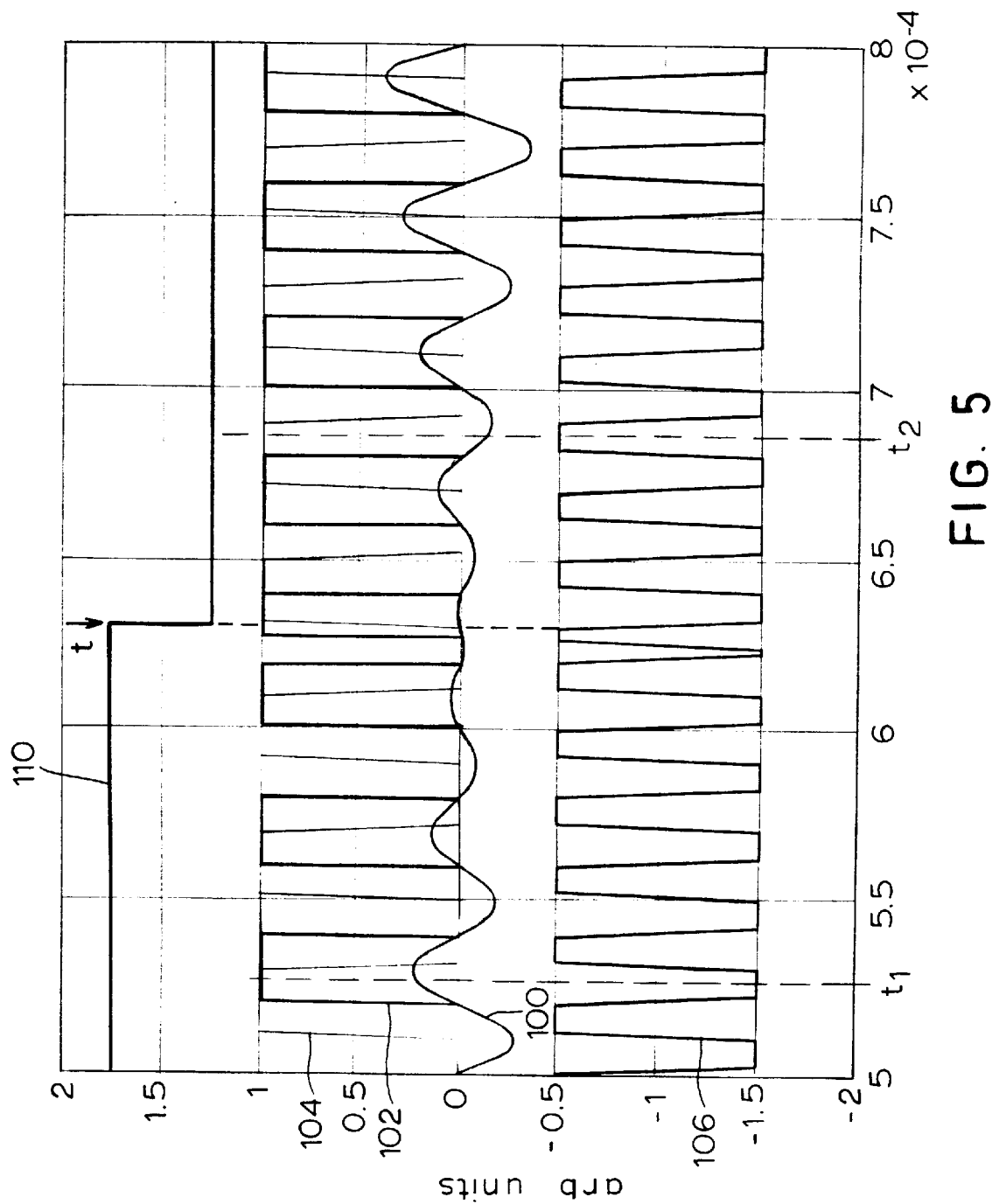

As seen in FIG. 4, an envelope 72 of the alternating waveform varies in a sinusoidal fashion such that the polarity of the envelope periodically changes (i.e., passes through zero). The alternating waveforms developed across the windings 54a–54c are displaced relative to one another by 120° and the instants at which the envelopes change polarity are detected and used to produce transitions in the signals developed by the latches 66a–66c. More particularly, with reference to FIG. 5, the waveform 100 comprises a portion of the alternating current waveform shown in the lower portion of FIG. 4 surrounding the zero crossing of the envelope 72 and on an expanded time scale. The comparators 60a–60c convert each alternating current waveform into a series of pulses, one of which is seen as the waveform 102, which results from the comparison of the waveform 100 with a zero reference level. (While the waveform 102 is not truly a square wave, such term is used to describe the waveform for ease of description.) The waveform 104 illustrates the clock signal developed by the latch circuit 44 while the signal 106 represents the sign signal resulting from the comparison effected by one of the exclusive OR gates 62a–62c in response to application of the waveforms 102 and 104 thereto. The delay circuits 28 shift the waveform 106 and the corresponding waveforms from the remaining exclusive OR gates 62 to the right as seen in FIG. 5 by an amount equal to one microsecond. Such shifting causes a delay in the arrival of a new logic state at the inputs of the latches 30 until the previous state has been latched by the rising edge of a pulse in the clock signal represented by the waveform 104.

As can be seen from an inspection of FIG. 5, the shifting of the excitation waveform by the RC circuits formed by the elements R1–R3 and C1–C3 causes the peaks in the alternating current waveform 100 to be substantially, if not fully coincident with the rising edges of the clock signal represented by the waveform 104. The comparators 60a–60c and the exclusive OR gates 62a–62c sense when the alternating waveforms developed across the secondary windings 54a–54c go through a null and reverse phase with respect to the excitation voltage. Because no hysteresis is necessary in the comparators 60a–60c the circuit can accurately detect the state transitions of the secondary or alternating waveforms to within one quarter of the period of the excitation waveform.

As can be seen from an inspection of FIG. 5, a transition in the signal produced by the latch circuit 66a occurs when a rising pulse edge in the waveform 104 is received by the exclusive OR gate 62a during the time that the waveform 102 is in a high state. This transition is shown as a positive to zero pulse edge in the waveform 110 of FIG. 5 at a time t. The waveform 110 remains in such state until the alternating waveform 100 again changes polarity, whereupon the exclusive OR gate 62a receives a rising pulse edge from the clock signal and a low logic state in the waveform 102.

The outputs of the latches 66b and 66c (and therefore the outputs of the buffers 70b and 70c) are identical to the waveform 110 of FIG. 5, except that they are phase shifted 120° and 240°, with respect thereto, respectively.

The use of the clock signal developed at the output of the latch 44 for multiple purposes results in unique advantages. As is evident from the foregoing, the clock signal serves as the reference for the gating circuits 26 which sample the primary-to-secondary phase relationship. This relationship is known to be accurate just before each rising edge in the clock signal because these transitions occur at or near the peaks of the alternating waveforms. As a result of this timing relationship, the rising edges of the clock pulses are at or substantially coincident with the centers of low or high logic states in the waveform 102. This provides immunity against false logic states in the output signals due to noise which naturally occurs at the transitions between the low and high logic states of the waveform 102.

The clock signal developed by the latch circuit 44 also controls or clocks the operation of the flip flop 66a–66c to produce the output signals. The states of the signals provided to the flip flops 66a–66c are guaranteed to be correct by the delay circuits 28 which, as noted previously, delay the arrival of the new logic state at the inputs of the flip flops 66a–66c until the last state has been latched by a positive edge of the clock signal 104. The multiple function of the clock signal and the use of the delay circuits 28 eliminate the need for an additional comparator for the excitation signal, and allow the entire circuit to operate from a single power supply.

Because the driver circuits 50 and 46 are preferably of the CMOS type, the circuit has very low overall power dissipation yet can provide up to 30 milliamps rms of excitation current. This, in combination with the other advantages noted above, results in a circuit which is accurate and inexpensive as compared with known circuits.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A converter circuit for converting an alternating signal representing continuous rotary position and comprising a series of peaks having amplitudes which vary according to an envelope having an envelope polarity into a further signal representing discrete rotary position, comprising:

means operable when the alternating signal is near a peak of the series of peaks for sampling the envelope polarity; and means coupled to the sampling means for developing the further signal, the developing means including means for causing a state change in the further signal indicative of rotary position when the envelope changes polarity.

2. The converter circuit of claim 1, wherein the alternating signal is developed by a synchro having a primary winding which receives an excitation waveform having a waveshape other than a pure sinusoid and a secondary winding.

3. The converter circuit of claim 2, wherein the excitation waveform is derived from a clock signal developed by a clock.

4. The converter circuit of claim 1, wherein the sampling means comprises a comparator which converts the alternating signal into a square wave.

5. The converter circuit of claim 4, further including a clock which develops a clock signal and wherein the sampling means further comprises a logic gate which compares the square wave with a clock signal.

6. The converter circuit of claim 5, wherein the logic gate comprises an exclusive OR gate.

7. The converter circuit of claim 5, further including a delay circuit coupled to the logic gate.

8. The converter circuit of claim 7, wherein the developing means comprises a latch coupled to the delay circuit wherein the latch receives the clock signal at a control input thereof.

9. A circuit for converting a first plurality of alternating signals developed by a synchro coupled to a rotor into a second plurality of logic signals representing position of the rotor wherein the synchro includes an excitation winding that receives an excitation waveform which is obtained from and phase shifted with respect to a clock signal, comprising:

means for converting each alternating signal into a square wave;

means for gating each square wave with the clock signal to obtain a number of gated signals each representing a time at which an envelope of an associate alternating signal changes polarity; and means triggered by the clock signal for repetitively latching each gated signal to derive the second plurality of logic signals.

10. The circuit of claim 9, wherein the excitation waveform is other than a pure sine wave.

11. The circuit of claim 9, wherein the converting means comprises a number of comparators each receiving one of the alternating signals.

12. The circuit of claim 11, wherein the gating means comprises logic gates coupled to the comparators.

13. The circuit of claim 12, wherein the logic gates comprise exclusive OR gates.

14. The circuit of claim 11, further including delay circuits coupled to the logic gate.

15. The circuit of claim 14, wherein the latching means comprise latch circuits coupled to the delay circuits.

16. The circuit of claim 9, further including a single power supply.

17. A circuit for converting three alternating signals each representing continuous rotary position and comprising a series of peaks having amplitudes which vary according to an envelope having an envelope polarity into three logic signals representing discrete rotary position, comprising:

three comparators each converting one of the alternating signals into a square wave;

a clock which develops a clock signal;

three logic gates each operable when a corresponding alternating signal is near a peak of the series of peaks for gating an associated square wave with the clock signal to obtain three sign signals representing envelope polarity; and three latches coupled to the three logic gates and triggered by the clock signal for repetitively latching each sign signal to derive the logic signals.

18. The circuit of claim 17, wherein each logic gate comprises an exclusive OR gate and further including delay circuits coupled between the logic gates and the latches.

19. The circuit of claim 18, wherein the alternating signals are developed by a synchro having an excitation winding that receives an excitation waveform which is obtained from and phase shifted with respect to the clock signal.

20. The circuit of claim 19, further including a single power supply coupled to the comparators and the logic gates.

* * * * *